Figure 1:
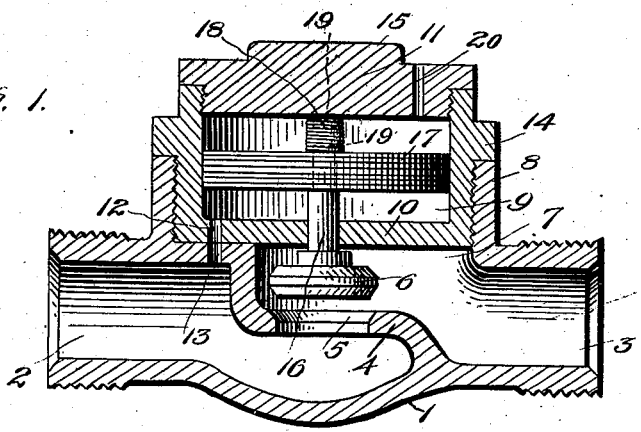

No. 670,563.　　　　　　　　　　　　　　　　Patented Mar. 26, 1901.
W. S. MORRIS.
AUTOMATIC EQUALIZING CHECK VALVE AND AIR BRAKE MECHANISM.
(Application filed Sept. 20, 1900.)

(No Model.)　　　　　　　　　　　　　　　　2 Sheets—Sheet 1.

Witnesses　　　　　　　　　　　　　Inventor
　　　　　　　　　　　　　　　　　　W. S. Morris
　　　　　　　　　　　　by
　　　　　　　　　　　　　　　　　　　Attorneys No. 670,563. Patented Mar. 26, 1901.
W. S. MORRIS.
AUTOMATIC EQUALIZING CHECK VALVE AND AIR BRAKE MECHANISM.
(Application filed Sept 20, 1900.)
(No Model.)
2 Sheets—Sheet 2.
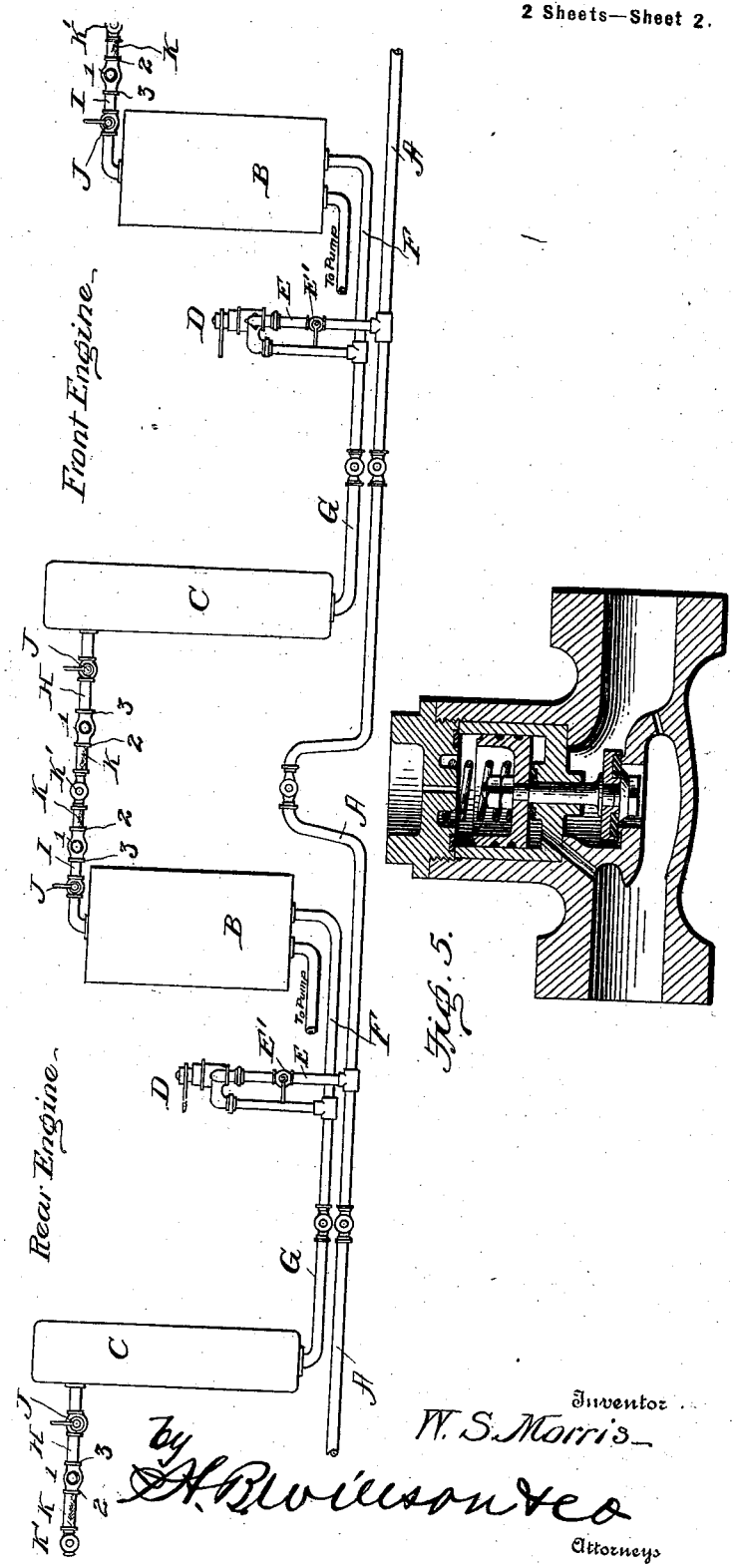

UNITED STATES PATENT OFFICE.

WILLIAM S. MORRIS, OF RICHMOND, VIRGINIA.

AUTOMATIC EQUALIZING CHECK-VALVE AND AIR-BRAKE MECHANISM.

SPECIFICATION forming part of Letters Patent No. 670,563, dated March 26, 1901.

Application filed September 20, 1900. Serial No. 30,599. (No model.)

*To all whom it may concern:*

Be it known that I, WILLIAM S. MORRIS, a citizen of the United States, residing at Richmond, in the county of Henrico and State of Virginia, have invented certain new and useful Improvements in Automatic Equalizing Check-Valves and Air-Brake Mechanisms; and I do declare the following to be a full, clear, and exact description of the invention, such as will enable others skilled in the art to which it appertains to make and use the same.

My invention relates to an automatic equalizing check-valve for use in air-brake and other fluid-pressure systems or pipes for automatically controlling and equalizing the conditions of any two or more fluid-pressures through connections with one another and for cutting off the flow of air or other fluid-pressure in the event of parting or uncoupling of such connections; also, to an improved construction and arrangement of pipes and valves in an air or other fluid-pressure brake system by means of which the fluid-pressure-supplying devices on the rear engine of two engines coupled together may be employed in coöperation with the fluid-pressure-supplying devices of the front or leading engine for supplying pressure from its reservoirs to the train-pipe, so as to assist in supplying the brakes on long trains.

The objects of the invention are, first, to provide an automatic check-valve which is simple in construction and effective in operation and designed to be employed in a fluid-pressure pipe or system using air, gas, steam, water, or other fluid medium for controlling and equalizing the pressure between two or more connections and automatically cutting off the outflow of the fluid medium at one side or from one connection when the pressure on the opposite side or in the other connection is reduced below a determined point or becomes depleted, said valve when employed, as primarily intended, in an air-brake system serving to cut off the exhaust of air from one car or engine of a train when the couplings between the same and another car or engine become disconnected, and, second, to provide a construction and arrangement of pipes and valves whereby the fluid-supplying devices of two engines when coupled together for drawing a long train may be connected up so as to adapt the fluid-supplying devices of the rear engine to be employed so as to coöperate with those of the leading engine and assist in supplying air for the operation of the brakes.

With these and other minor objects in view the invention consists of certain novel features of construction, combination, and arrangement of parts, as will be hereinafter more fully described, and particularly pointed out in the appended claims.

Figure 2:
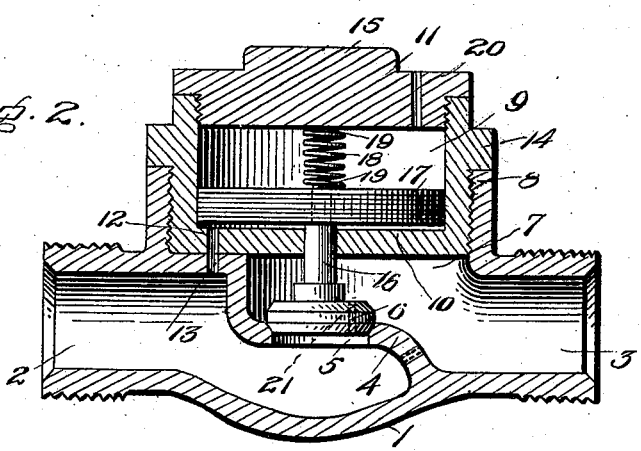
Figure 3:
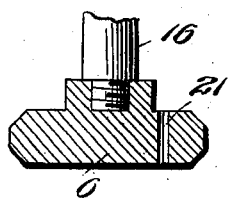

In the accompanying drawings, Figure 1 is a vertical sectional view of an automatic equalizing check-valve embodying my invention, showing the valve in its normal open position. Fig. 2 is a similar view showing the valve closed. Fig. 3 is a detail sectional view of the valve proper. Fig. 4 is a diagrammatic view showing my improved air-brake connections for connecting up the air-supplying devices of coupled engines. Fig. 5 is a vertical sectional view of a slightly-modified form of valve.

Referring now more particularly to the drawings, wherein like reference characters designate corresponding parts throughout the several views, the numeral 1 represents the casing of my improved automatic check-valve, which is provided with the threaded outlet and inlet ends 2 and 3 for connection with suitable pipes or couplings and a partition 4, dividing the interior of the casing into two chambers in the usual way and provided with a port 5, establishing communication between said chambers and controlled by the check-valve 6.

The intermediate portion of the casing, which is in communication with the inlet 3, is open at one side, as shown at 7, and from said side projects a cylindrical flange 8, into which is threaded or otherwise fitted a cup-shaped piston-chamber 9, whose bottom 10 rests upon the wall of the casing around the said opening 7. This chamber is closed at its outer end or top by a screw-cap 11 and is provided in its bottom with a port 12, which registers with a port 13 in the casing 1 on the opposite side of the partition from the opening 7, whereby communication is established between the outlet end 2 of the casing and said piston-chamber. The side wall of the piston-chamber is provided near its outer end with an angular flange or projection 14 for application of a wrench or a similar tool thereto, and the cap 11 is provided with an angular head 15 for a like purpose. The stem 16 of the valve 6 slides freely through an opening in the bottom of the piston-chamber 9 and enters said chamber and has connected thereto the piston 17, by which the piston and valve are mounted to move in unison. The piston is of relatively greater area than the valve and is pressed toward the bottom wall 9 of its chamber and the valve toward its seat by a coil-spring 18, interposed between the piston and cap 11 and held properly centered by lugs 19 or other projections therefrom. The cap is provided with a relief-port 20, which allows air to enter into and discharge from the casing upon the operation of the piston, and the valve is provided with a restricted feed-port 21, through which air passes from one side of the partition to the other. Instead of being located in the valve I may place the port in the partition 4, as shown in dotted lines, Fig. 2. The feed-port 21 constitutes a by-pass through which a restricted supply of air may flow from the inlet end 3 of the valve-casing to the outlet end 2 thereof when the valve 6 is closed.

The operation of the valve is as follows: The valve is connected up in practice between two pipes or conduits attached to the ends 2 and 3, as between the section of a train-pipe on one car and the hose-coupling for connecting said pipe with the train-pipe section of another car, the end 2 of the valve being arranged outwardly with respect to the adjacent end of the car and facing when on the forward end of a car in the direction from which the flow of fluid-pressure comes, or toward the locomotive. It will thus be readily understood that in the application of the invention to railway-cars the inlet ends 3 of the valves on a car will stand inwardly or nearest the ends of the car, while the outlet ends 2 of the valve will stand or project outwardly or away from the ends of the car, so that the outlet end 2 of the valve at the forward end of the car and the inlet end 3 of the valve at the rear end of the car will face forwardly or in the direction from which the flow of fluid-pressure comes from the locomotive. In the ordinary use of the valve with the inlet end 3 facing in the direction from which the fluid-pressure is being supplied the fluid pressure—air, for instance—enters the end 3 and feeds through the port 21 in the valve to the opposite end 2 of the valve-casing and the pipe connected thereto and through the ports 13 and 12 into the piston-chamber 8 until the pressure therein is sufficient to open the valve 6. As the piston is of greater area than the valve a comparatively low pressure raises said piston against the tension of said spring and the pressure on the valve, thus opening the port 5 and allowing the air to flow freely through the valve. This is the normal position of the parts in the operation of the device. When, however, the pressure in the valve-casing becomes depleted or reduced below that required to hold the piston and valve elevated above the tension of the spring 18, said spring forces the piston downward or inward and seats the valve, thus closing the port 5 and preventing the flow of air through said port. When the valve is used in the train or steam lines of cars in place of the usual angle-cock, the action of the valve in thus closing prevents the escape of steam or air except through the small port or passage 21 in case of a reduction of pressure caused by separation of the coupling between two cars. By this means a rapid reduction of pressure is avoided, and in the case of an air-brake system the port or passage 21 will permit of a slight reduction of pressure in the train-pipe, which will cause a partial application of the brakes, thus notifying the engineer of the separation of the cars. When the connection between the coupling is again restored, the steam or air feeds gradually through the port 21 until the pressure on side 2 of the valve is sufficient to operate the piston, whereupon the valve is again elevated in the manner above described to allow air or steam to pass freely through the casing. The relative proportions of the piston and valve may be varied as desired, according to the degree of sensitiveness required, and a spring of any desired stiffness used. The relief-port 20 allows air to enter the piston-chamber upon the downward movement of the piston to prevent the creation of a vacuum and to discharge upon the upward movement of the piston to prevent the formation of an air-cushion.

When two or more cars are coupled up in a train, it will be readily understood from the foregoing description that air from the locomotive first enters the end 2 of the valve at the front end of the forward car, raises the valve 6 thereof off its seat, and flows rearwardly through the train-pipe until the valve at the rear end of the said forward car is reached, when the air enters the end 3 of the valve at that end of the car and feeds gradually through the port or by-pass 21 until the pressure on the end 2 of said rear end valve is sufficient to operate the piston 17 and raise the valve member 6 thereof off its seat and fully open the port 5, and this action continues from car to car until the pressure is equalized throughout the entire length of the train-pipe. Upon the parting of two cars the reduction of pressure on the outlet ends 2 of the valves at the rear end of the forward car and front end of the rear car will cause the valve member 6 thereof to close and cut off the outflow of air except, as hereinbefore stated, through the small port or by-pass 21.

In Fig. 4 of the drawings I have shown the application of my improved valve to a novel construction and arrangement of devices invented by me for connecting the air-supplying devices of two locomotives when coupled up for "double-heading," so as to allow air from the main air-reservoir of the rear engine to be used in connection with the air from the main air-reservoir of the front or leading engine to assist in the operation of the brakes on long trains. Referring to Fig. 4, the devices shown on the right represent the leading engine, those on the left the rear or following engine, and A is the train-pipe, connected by hose and couplings throughout the train and which in my invention is capable of being put in communication with the main reservoirs of both engines. As both engines are equipped exactly alike, a description of one will suffice for both. They have the following old features in common use, which are shown in outline only—viz., the main air-reservoir B on the engine, the secondary reservoir C on the engine-tender, the engineer's brake-valve D, the pipe E, connecting said valve with the train-pipe A and provided with the cock E', by which the engineer's valve is cut off from the train-pipe, the pipe F, connecting one end of the main air-reservoir with the engineer's brake-valve, and the pipe G on the engine-tender, connecting one end of the secondary reservoir C with the pipe F. The parts invented and applied by me for the purpose stated consist of the pipe H, connected to the opposite end of the secondary reservoir C from the pipe G, and the pipe I, connected to the opposite end of the main reservoir B from the pipe F. Each of these pipes is provided with a hand-cock J and an automatic valve 1 of the construction heretofore described, to each of which is connected a hose K, having the usual coupling K'. The inlet ends 3 of the valves 1 are connected to the pipes H and I so as to face in the direction of the reservoir in each instance, while the outlet ends 2 thereof are connected to the hose-pipes. In practice the pipes H and I are located on the opposite side of the engine from the train-pipe and air-supplying devices, such as the pump and connections, and the hose connection of the pipe H extends from the secondary reservoir C downward from the top of the tender-tank to the rear, while the hose connection of the pipe I extends forward from the main reservoir B, above the pilot at the front of the engine. In employing the connections when double-heading or connecting up two engines the hose coupling of the pipe I on the rear engine is coupled up with the hose-coupling of the pipe H at the rear of the tender of the forward engine, thus bringing the reservoirs of the two engines into communication with each other and with the train-pipe through the engineer's brake-valve. The cocks J are then opened and the cock E' in the pipe E of the rear engine closed. The engineer of the leading engine may then control the air from both engines in braking the train. Should the hose-couplings K' between the two engines part, the automatic valves 6 of the valve devices 1 will immediately close, owing to the reduction of air-pressure, and cut off the outflow of air, as will be readily understood from the foregoing description of the valve.

I may employ the valve in the steam and air train-line pipes at the ends of the cars for cutting off the flow of steam and air when the couplings part and in any other fluid-pressure system in which the use of a valve of this character may be found necessary or desirable, and its advantages over other forms of valves for use in this connection will be readily understood from the foregoing description. The feed-port 21 may be, as hereinbefore stated, arranged in the partition 4 instead of in the valve, and when the valve is used in a steam-heating system this port is adapted to serve as a drainage-port to relieve the valve of condensation and keep up a continuous circulation.

It will of course be understood that various modifications in the structure of the parts may be made without departing from the spirit and scope of the invention as defined by the appended claims.

Having thus described my invention, what I claim, and desire to secure by Letters Patent, is—

1. An automatic equalizing check-valve, comprising a casing having a valve-chamber provided with inlet and discharge passages and a piston-chamber in communication with the outlet-passage of the valve-chamber, a valve, arranged between said passages and controlling the flow of fluid through the valve-chamber, a feed port or passage establishing communication between the inlet and outlet passages of the valve-casing, and a piston in said piston-chamber and connected to the valve, substantially as set forth.

2. An automatic equalizing check-valve, comprising a casing having a valve-chamber provided with inlet and outlet passages and a piston-chamber, a port in the casing establishing communication between the outlet-passage of the valve-chamber and the piston-chamber, a valve in the valve-chamber and between said passages, a piston in the piston-chamber and connected to the valve, and a port or passage establishing communication between the inlet and outlet passages of the valve-chamber when the valve is closed, substantially as set forth.

3. An automatic equalizing check-valve, comprising a casing having a valve-chamber provided with inlet and outlet passages, a piston-chamber detachably connected with the valve-casing and in communication with the outlet end of the valve-chamber, a cap closing the outer end of the piston-chamber, a valve in the valve-chamber, a piston in the piston-chamber and connected to the valve, and a spring acting on said piston, substantially as set forth.

4. In an air-brake system, the combination with the train-pipe, engineer's brake-valve, and air-reservoirs of a locomotive and tender, of auxiliary pipes leading from said reservoirs and adapted to be connected to establish communication between the air-supplying means of two coupled locomotives, and valves in said pipes, substantially as set forth.

5. In an air-brake system, the combination with the train-pipe, engineer's brake-valve, and air-reservoirs and connecting-pipes of a locomotive and tender, of auxiliary pipes leading from said reservoirs, couplings for connecting the reservoir-pipe of the tender of one locomotive to the main reservoir of another locomotive, and automatic equalizing check-valves in the auxiliary pipes adapted to close and cut off the flow of air when the couplings part, substantially as set forth.

In testimony whereof I have hereunto set my hand in presence of two subscribing witnesses.

WILLIAM S. MORRIS.

Witnesses:
J. J. EWING,
W. P. HUNTLEY, Jr.